(12) United States Patent
Czeppel et al.

(10) Patent No.: US 6,972,653 B2
(45) Date of Patent: Dec. 6, 2005

(54) DISPLACEMENT CONTROL DEVICE

(75) Inventors: Thomas Czeppel, Möttlingen (DE);
Udo Kölbl, Altdorf (DE); Norbert Quast, Aidlingen (DE); Rolf Ziegler, Illingen (DE)

(73) Assignee: Moog Inc., East Aurora, NY (US)

( * ) Notice: Subject to any disclaimer, the term of this patent is extended or adjusted under 35 U.S.C. 154(b) by 42 days.

(21) Appl. No.: 10/690,225

(22) Filed: Oct. 21, 2003

(65) Prior Publication Data

US 2004/0130846 A1    Jul. 8, 2004

(30) Foreign Application Priority Data

Oct. 22, 2002 (DE) ............................... 102 49 197
Feb. 25, 2003 (DE) ............................... 103 08 017

(51) Int. Cl.$^7$ ............................................... H01F 7/08
(52) U.S. Cl. ................... 335/220; 251/129.15
(58) Field of Search ............... 251/129.01–129.15, 251/75–76; 91/347; 137/99; 335/220–229, 335/132, 165–195

(56) References Cited

U.S. PATENT DOCUMENTS 1,692,770 A    11/1928   Eggleston
3,512,549 A  *  5/1970   Wiegand .................... 137/489
4,205,820 A  *  6/1980   Bray ........................... 251/94
4,489,756 A  * 12/1984   Balz ....................... 137/625.33
4,899,639 A     2/1990   Seebacher

FOREIGN PATENT DOCUMENTS

DE          15 00 307 B      11/1969
DE          20 25 300 A      12/1971
GB           1592467 A        7/1981
WO         WO 02 35123 A      5/2002

* cited by examiner

*Primary Examiner*—Lincoln Donovan
(74) *Attorney, Agent, or Firm*—Phillips Lytle LLP

(57) ABSTRACT

A displacement control device (1) is adapted to move a member (23) relative to a body (7). The displacement control device includes a drive means (2, 3) and an emergency actuator (8) arranged mechanically in series with the member. The actuator includes a housing (16) and a spring (14) arranged to act between the housing and the member. The improvement comprises: the actuator including a toggle linkage (9) acting between the housing and the spring, the toggle linkage having two pivotally-connected links (10, 11) that are adapted to be selectively moved between a collapsed position at which the links are arranged at an acute included angle, and an extended position at which the links are arranged at an obtuse included angle slightly less than 180°. The toggle linkage is arranged such that the spring will be more greatly compressed when the links are in the extended position than when the links are in the collapsed position. The toggle linkage is arranged to be held in the extended position by a magnetically-actuated latching pin.

13 Claims, 3 Drawing Sheets

DISPLACEMENT CONTROL DEVICE

TECHNICAL FIELD

The present invention relates generally to an improvement in a safety device used in conjunction with a valve control drive mechanism.

BACKGROUND ART

It is known to provide a solenoid-operated spring-loaded extensible actuator connected in series with a screw-drive actuator for moving a valve pintle. De-energizing the solenoid releases a preloaded spring, and allows the link to extend through a displacement equal to the maximum travel of the valve pintle so that the valve can be rapidly closed at any position of the drive mechanism. See, e.g., publication WO 02/35123 A1, the aggregate disclosure of which is hereby incorporated by reference.

DISCLOSURE OF THE INVENTION

In the inventive improvement, a toggle linkage (9) is provided between the link housing (16) and a spring-driven output member (23). When the spring is fully compressed, by causing the valve drive to move the valve pintle onto its seat, the toggle linkage is extended, and the two pivotally-connected links approach being in a straight line. In this condition, the toggle links can be constrained to hold the high spring compression force by means of a much smaller transverse force applied to one of the links by a solenoid-operated latching device. This device may take the form of a solenoid which inserts a latching pin to hold the linkage in its extended position, or, alternatively, may consist of a solenoid armature, directly carried on one of the toggle links, and brought into proximity to an electromagnetic pole structure when the linkage is extended.

With parenthetical reference to the corresponding parts, portions or surfaces of the disclosed embodiments, merely for purposes of illustration, and not by way of limitation, the present invention broadly provides and improvement in a displacement control device (1) adapted to move a member (23) relative to a body (7), the displacement control device including a drive means (2, 3) and an emergency actuator (8) arranged mechanically in series with the member. The actuator includes a housing (16) and a spring (14) arranged to act between the housing and member. The improvement broadly comprises: the actuator having a toggle linkage (9) acting between the housing and the spring, the toggle linkage having two pivotally-connected links (10, 11) that are adapted to be selectively moved between a collapsed position at which the links are arranged at an acute included angle, and an extended position at which the links are arranged at an obtuse included angle of slightly less than 180°, the toggle linkage being arranged such that the spring will be more greatly compressed when the links are in the extended position than when the links are in the compressed position.

In the preferred form, the invention further comprises a latching means for constraining the links in the extended position as the housing is retracted away from the body to open the valve. The latching means may be magnetically operated. The latching means may include at least one latching pin (18). The latching means may include a solenoid having an armature and a return spring, and wherein the armature is associated with the latching pin such that the return spring will move the latching pin to an unlatched position in the absence of electrical power to the solenoid.

The drive means may include an externally-threaded rotatably-driven screw (2), and an internally-threaded nut connected to the housing. The screw may be matingly received in such nut such that rotation of the screw will cause linear movement of the housing relative to the body.

The range of motion of the member may be about 30 mm. In the preferred form, the member is arranged to engage the body with a force of up to about 250 kN. The links are arranged at an obtuse included angle of about 172°–177° when the links are in the extended position. The spring is arranged to move the links from the extended position to the collapsed position in less than 200 milliseconds.

Accordingly, the general object of the invention is to provide an improved displacement control device for a valve or the like.

Another object is to provide an improved displacement control device in which a valve member is movable toward and away from a body by either a drive screw or an emergency actuator.

These and other objects and advantages will become apparent from the foregoing and ongoing written specification, the drawings, and the appended claims.

DESCRIPTION OF THE PREFERRED EMBODIMENTS

Figure 1:
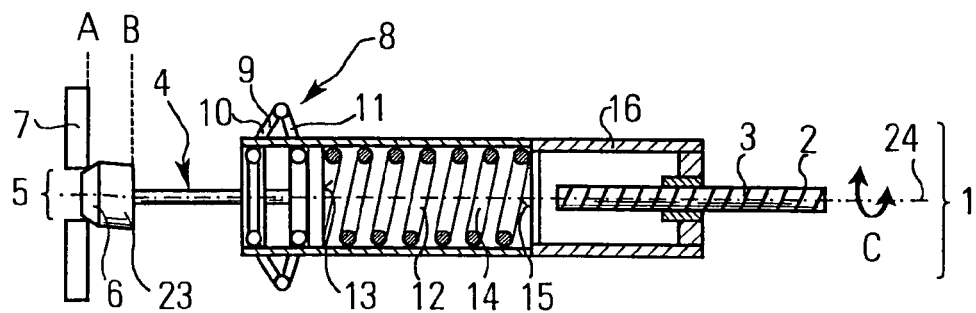
FIG. 1 is a schematic view of a first form of the improved displacement control device, showing the links as being in their collapsed position, with the valve pintle engaging the seat.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

FIG. 1 shows schematically a first form of the improved displacement control device 1 described above. A valve member or pintle 23 is moved along axis 24 through a working stroke between positions A and B with respect to seat 5 in a body 7 by a stem 4, in turn supported by extensible-link cartridge 16 and driven by a screw 3 engaged in a nut in cartridge 16. The valve stem 4 connects to a flange 13 to engage one end of spring 14 and loads it against a support surface 15 in the cartridge housing 16. Two symmetrically-arranged toggle linkages, severally indicated at 9, are connected between flange 13 and housing 16 end closure. The toggle linkages are comprised of links 10 and 11, which are folded to form an acute included angle.

Figure 2:
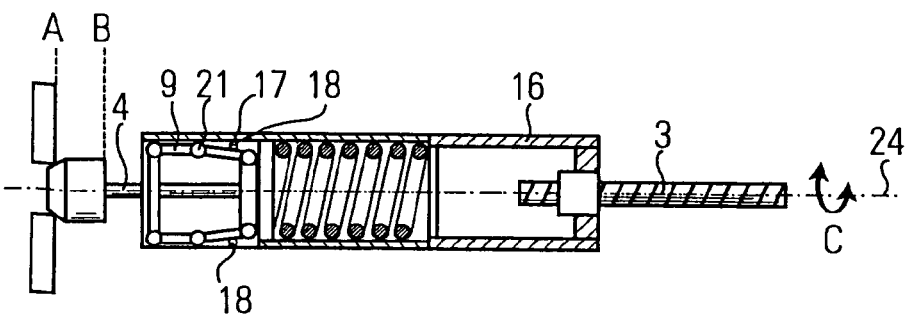
FIG. 2 is a view similar to FIG. 1, but showing the screw as having been rotated to translate the housing leftwardly so that the links will move from their collapsed position to their extended position.

In FIG. 2, the cartridge 16 has been advanced by means of the screw drive to a position where the spring is compressed and the toggle links are extended so as to form a nearly-straight line, but just short of the point where they would tend to fold in the opposite direction. At this point, latch pins 18 may be introduced through suitable openings in the housing to constrain the links in their extended positions as the cartridge is retracted to open the valve to position B as shown in FIG. 3.

Figure 3:
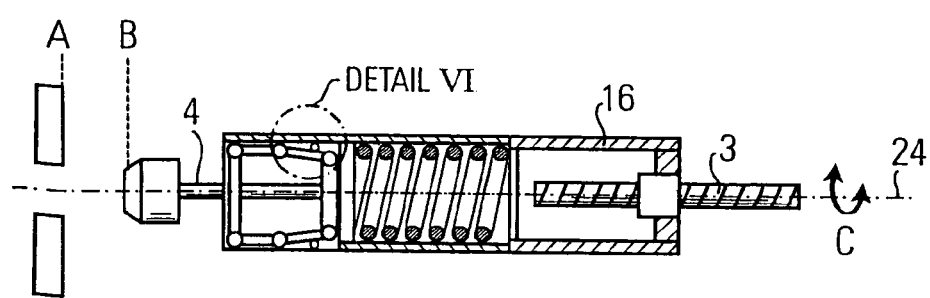
FIG. 3 is a view similar to FIG. 2, but showing the links as being held in their extended position by a latching pin, and further showing the screw as having been rotated in the opposite direction to move the housing and valve pintle away from the body.
Figure 4:
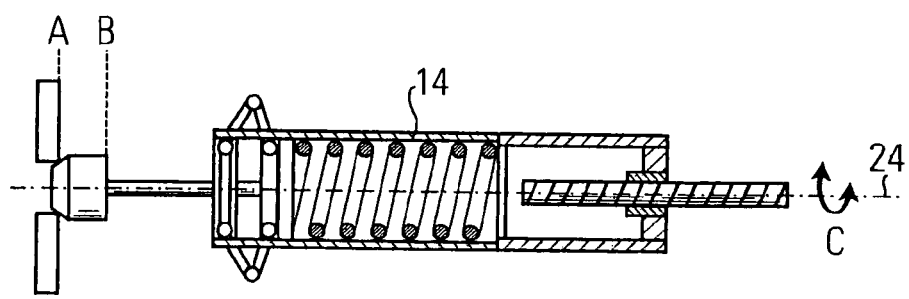
FIG. 4 is a view similar to FIG. 3, but showing the links as having been moved from their extended position to their collapsed position, and further showing the valve pintle as sealingly engaging the seat.

FIG. 4 shows the screw drive 3 and the cartridge 16 in the same position with respect to the valve body 7 as in FIG. 3, and illustrates the result of withdrawing the latch pins 18, allowing the spring to drive flange 13 and valve stem 4 to close the valve.

Figure 5:
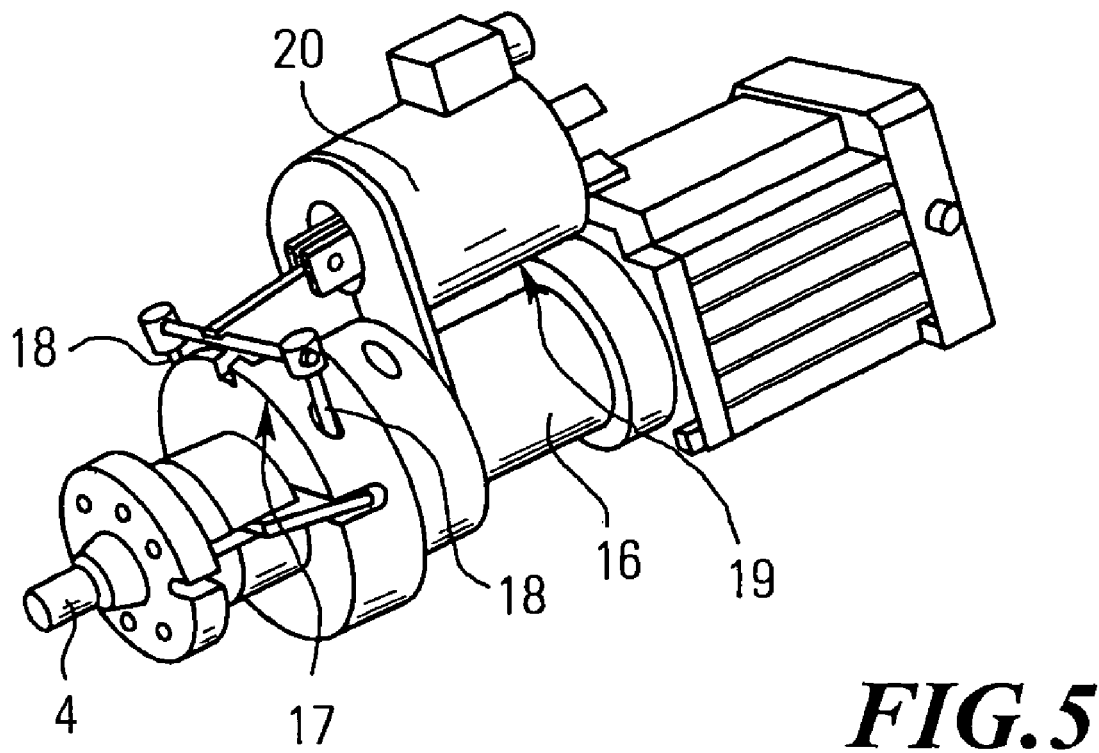
FIG. 5 is a perspective view of the mechanism shown schematically in FIGS. 1–4.

FIG. 5 is a perspective view of the mechanism shown schematically in FIGS. 1 through 4, with the valve stem 4 extending from the left end and including the cartridge housing 16 and the screw drive motor. Mounted on housing 16 is a latching mechanism 19 including a solenoid 20 acting through a lever to move latching pins 18. The solenoid contains a retracting spring (not shown) arranged to retract the pins 18 when the solenoid is de-energized.

Figure 6:
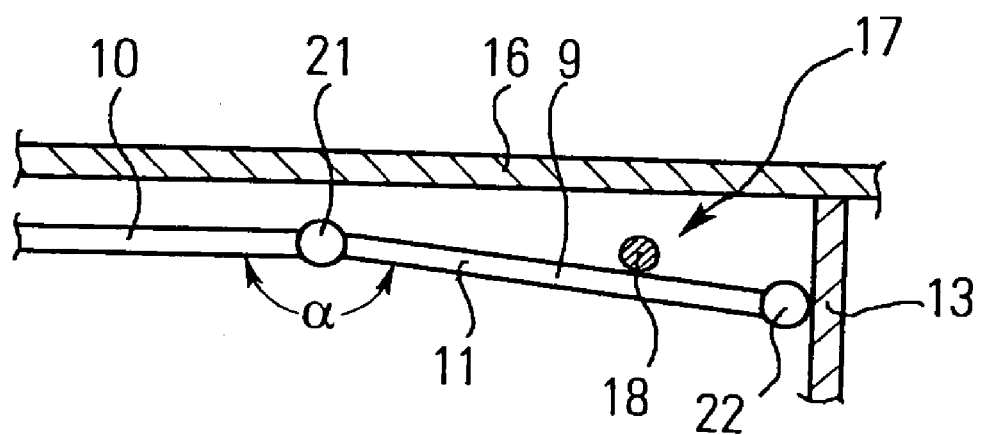
FIG. 6 is an enlarged schematic detail view of the designated area in FIG. 3, and shows the latching pin.

FIG. 6 is an enlarged schematic of the detail area designated in FIG. 3 and shows the links 10 and 11 in the latched position defined by insertion of pin 18. In this position, the links approach an obtuse included angle of slightly less than 180°, and normally in the range of 172°–177°.

Figure 7:
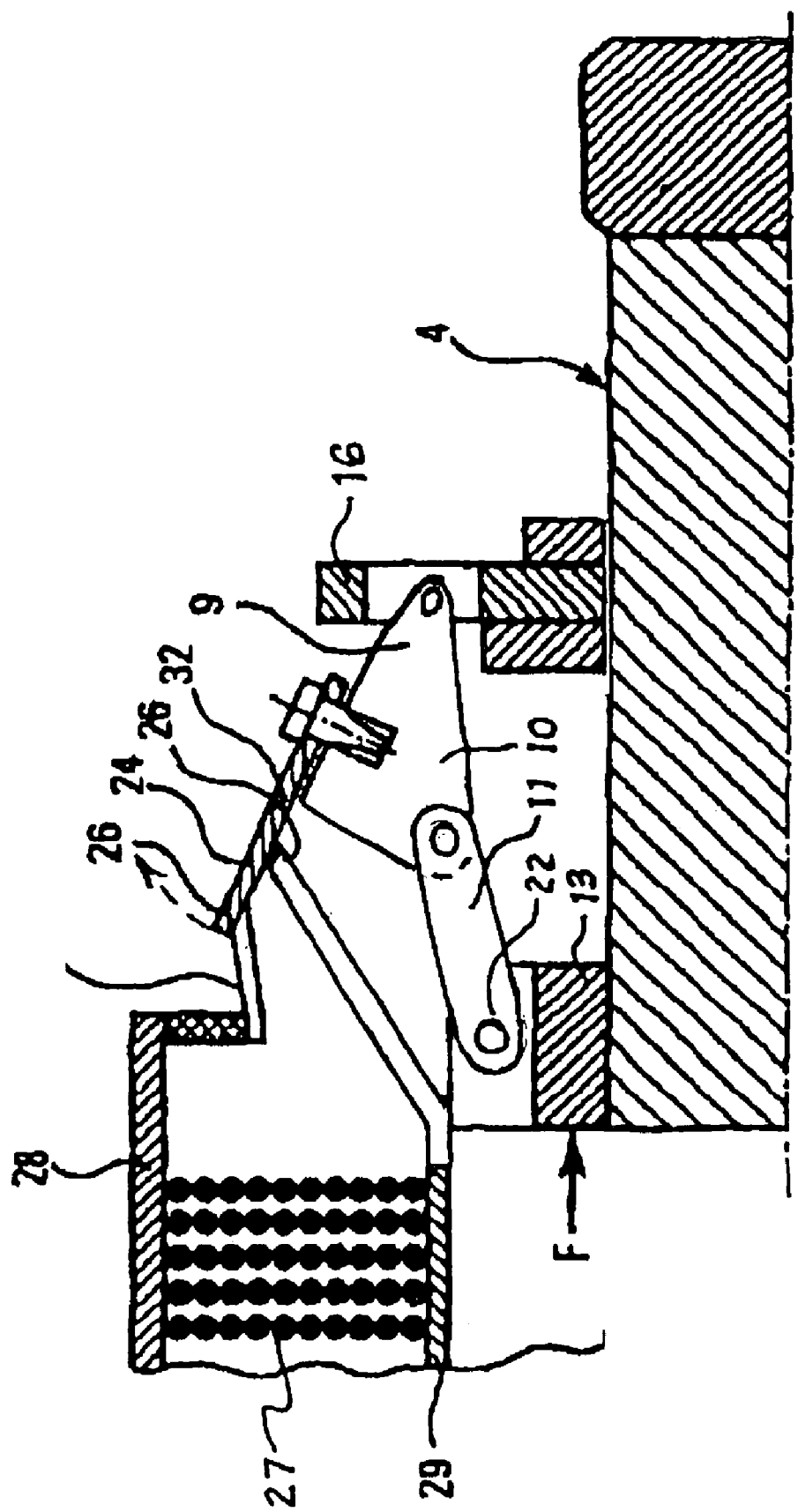
FIG. 7 is a schematic view of an alternative form of the mechanism.

FIG. 7 schematically illustrates an alternative embodiment of the invention in which the toggle linkage 9 is latched in the spring-holding position by means of a solenoid acting directly on an armature carried on one of the toggle links. Link 11 is pivoted at point 22 on spring flange 13 attached to valve stem 4. Compressed spring 14 (not shown) acts on flange 13 with force F. Link 10 is pivoted on housing 16 and has an enlarged area to accommodate an attaching screw mounting a magnetic armature plate 24. Solenoid coil 27 is surrounded by flux carrying outer and inner shells 28 and 29 which connect to pole pieces 31 and 32, each having end faces 26. Armature 24 contacts pole end faces 26 to complete a magnetic circuit which produces a holding force when coil 27 is energized. When coil 27 is deenergized, armature 24 and link 10 can rotate clockwise to allow the toggle linkage to shorten and thus permit the spring to advance the valve stem 4.

Therefore, while two forms of the invention have been shown and described, persons skilled in this art will readily appreciate that various changes and modifications may be made without departing from the spirit of the invention, as defined and differentiated by the following claims.

What is claimed is:

1. In a displacement control device (1) adapted to move a member (23) relative to a body (7), said displacement control device including a drive means (2, 3) and an emergency actuator (8) arranged mechanically in series with said member, said actuator including a housing (16) and a spring (14) arranged to act between said housing and said member, the improvement comprising:

said actuator including a toggle linkage (9) acting between said housing and said spring, said toggle linkage having two pivotally-connected links (10, 11) that are adapted to be selectively moved between a collapsed position at which said links are arranged at an acute included angle, and an extended position at which said links are arranged at an obtuse included angle slightly less than 180°, said spring being arranged to act on said toggle linkage at all relative link positions between said collapsed and extended positions, said toggle linkage being arranged such that said spring will be more greatly compressed when said links are in said extended position than when said links are in said collapsed position.

2. The improvement as set forth in claim 1 and further comprising a latching means for constraining the links in their extended position as the housing is moved away from the body to open the valve.

3. The improvement as set forth in claim 2 wherein said latching means is magnetically operated.

4. The improvement as set forth in claim 3 wherein said latching means includes at least one latching pin.

5. The improvement as set forth in claim 4 wherein said latching means includes a solenoid having an armature, and wherein said armature is associated with said latching pin such that said solenoid will move said latching pin to an unlatched position in the absence of electrical power to the solenoid.

6. The improvement as set forth in claim 1 wherein said drive means includes an externally-threaded rotatably-driven screw.

7. The improvement as set forth in claim 6 wherein said drive means includes an internally-threaded nut connected to said housing, and wherein said screw is matingly received in said nut such that rotation of said screw will cause linear movement of said housing relative to said body.

8. The improvement as set forth in claim 1 wherein the range of motion of said member is about 30 mm.

9. The improvement as set forth in claim 1 wherein said displacement control device is arranged to cause said member to engage said body with a force of up to about 250 kN.

10. The improvement as set forth in claim 1 wherein said links are arranged at an obtuse included angle of about 172°–177° when said links are in said extended position.

11. The improvement as set forth in claim 1 wherein said spring is arranged to move said links from said extended position to said collapsed position is less than 200 milliseconds.

12. The improvement as set forth in claim 1 wherein said latching means includes at least one solenoid armature mounted on one of said links.

13. The improvement as set forth in claim 12 wherein said solenoid has a magnetic circuit operatively arranged to move said armature.

* * * * *